(12) United States Patent
Song

(10) Patent No.: US 9,864,385 B2
(45) Date of Patent: Jan. 9, 2018

(54) PROTECTION DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Jun Song, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 326 days.

(21) Appl. No.: 14/678,141

(22) Filed: Apr. 3, 2015

(65) Prior Publication Data

US 2015/0292766 A1 Oct. 15, 2015

(30) Foreign Application Priority Data

Apr. 14, 2014 (CN) .......................... 2014 1 0147037

(51) Int. Cl.
*G06F 11/32* (2006.01)
*G05D 23/19* (2006.01)
*G05B 15/02* (2006.01)
*G06F 11/30* (2006.01)

(52) U.S. Cl.
CPC ......... *G05D 23/1921* (2013.01); *G05B 15/02* (2013.01); *G06F 11/3058* (2013.01); *G06F 11/325* (2013.01); *G06F 11/3031* (2013.01); *G06F 11/3089* (2013.01)

(58) Field of Classification Search
CPC .................................................. G05D 23/1921
USPC ........................... 340/584, 815.45, 540, 679
See application file for complete search history.

(56) References Cited

U.S. PATENT DOCUMENTS

| | | | | |
|---|---|---|---|---|
| 2006/0045168 A1* | 3/2006 | Socci | ...................... | G01K 7/42 374/163 |
| 2009/0096616 A1* | 4/2009 | Wu | ...................... | G03B 21/16 340/584 |
| 2011/0010706 A1* | 1/2011 | Lambert | ............. | G06F 9/45558 718/1 |
| 2013/0103979 A1* | 4/2013 | Feng | ........................ | G06F 1/28 714/14 |
| 2014/0285354 A1* | 9/2014 | Chen | ................... | G06F 11/3058 340/815.45 |

* cited by examiner

*Primary Examiner* — Brent Swarthout
(74) *Attorney, Agent, or Firm* — ScienBiziP, P.C.

(57) ABSTRACT

The disclosure provides a protection device including a temperature detection circuit, a switch circuit, a control circuit, and a warning circuit. The temperature detection circuit outputs temperature signal to the control circuit. The control circuit obtains the temperature signal from the temperature detection circuit, and compares the temperature signal with a preset temperature range and outputs a first control signal. The warning circuit sends warning based on the first control signal.

6 Claims, 2 Drawing Sheets

PROTECTION DEVICE

FIELD

The subject matter herein generally relates to a protection device.

BACKGROUND

When something wrong occurs in a computer and users are not alerted in time, the computer can be damaged.

BRIEF DESCRIPTION OF THE DRAWINGS

Implementations of the present technology will now be described, by way of example only, with reference to the attached figures.

DETAILED DESCRIPTION

Figure 1:
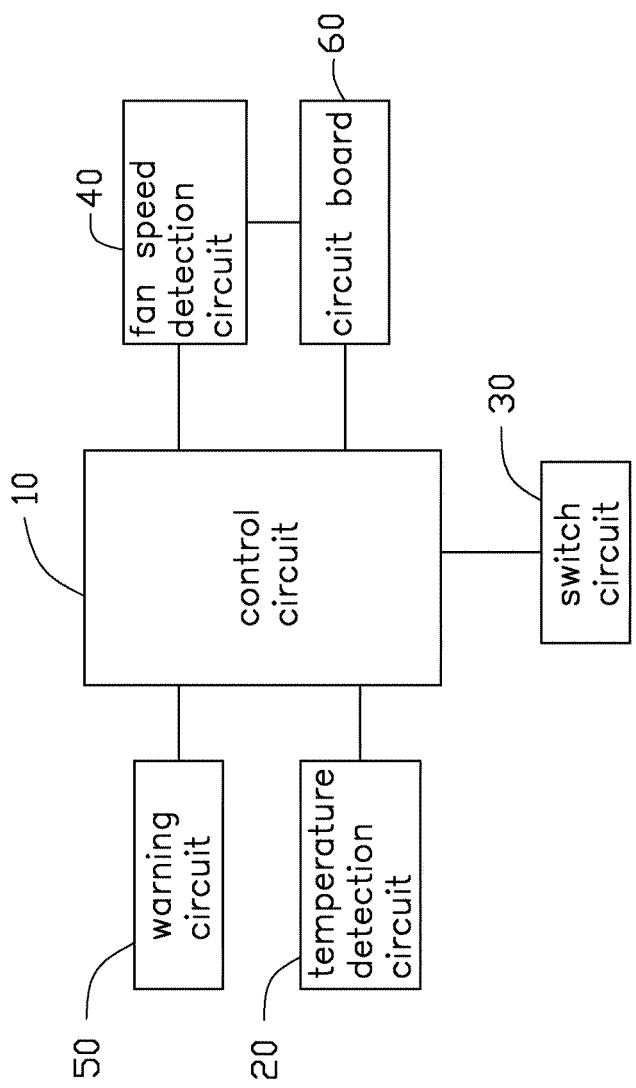
FIG. 1 is a block diagram of an example embodiment of a protection device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrates details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of a protection device of the present disclosure. The protection device in accordance with an exemplary embodiment comprises a control circuit 10, a temperature detection circuit 20, a switch circuit 30, a fan speed detection circuit 40, a circuit board 60, and a warning circuit 50. In the embodiment, the temperature detection circuit 20, the switch circuit 30, the fan speed detection circuit 40, the warning circuit 50, and the circuit board 60 are coupled to the control circuit 10. The fan speed detection circuit 40 is coupled to the circuit board 60. In the embodiment, the circuit board 60 is a motherboard of a computer.

Figure 2:
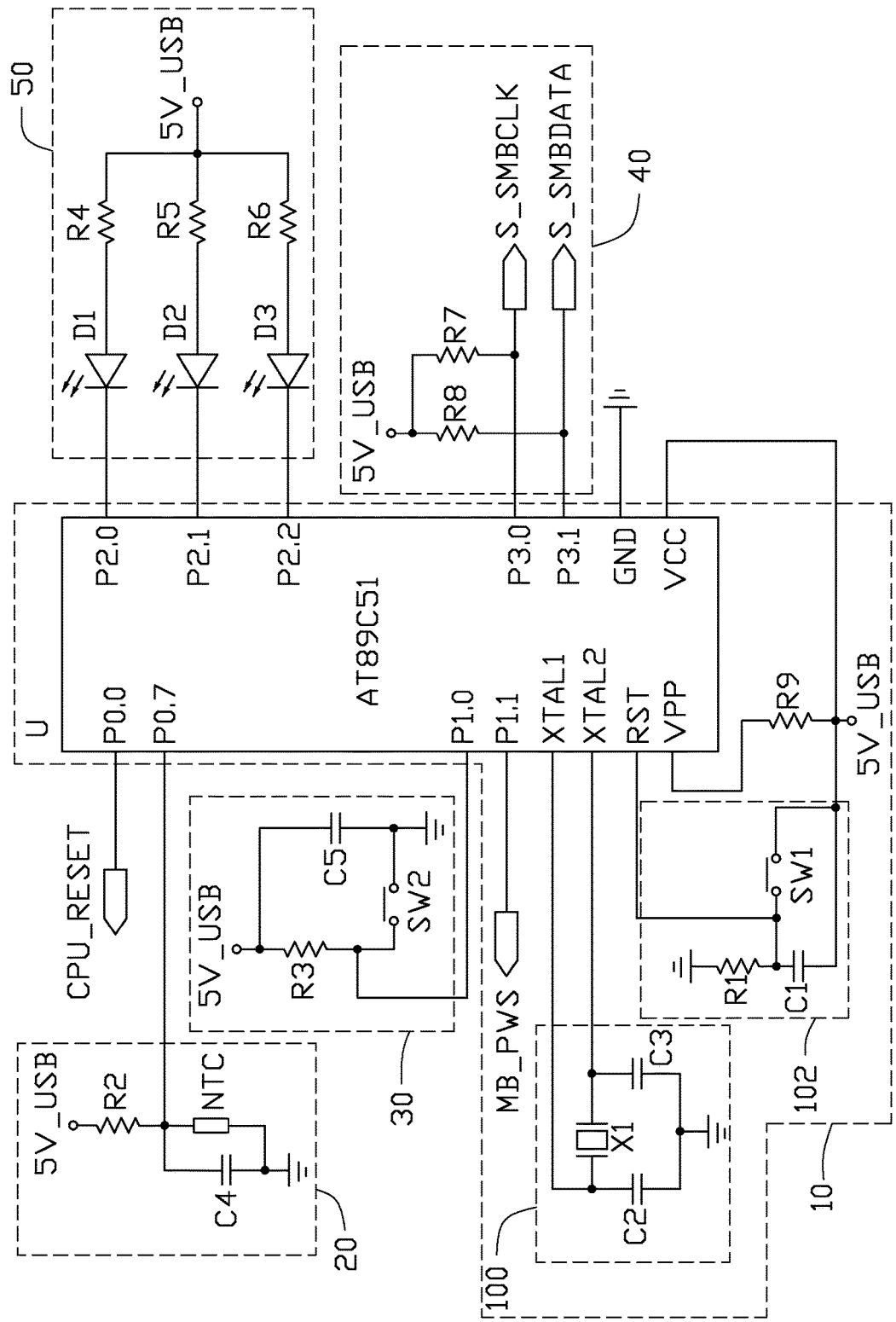
FIG. 2 is a circuit diagram of an example embodiment of a protection device of the present disclosure.

FIG. 2 illustrates that the control circuit 10 comprises a reset circuit 102, an oscillating circuit 100, and a micro controller U.

In the embodiment, the type of the micro controller U is AT89C51. A power pin VCC of the micro controller U can obtain a power supply 5V_USB from the circuit board 60. The reset circuit 102 comprises a resistor R1, a capacitor C1, and a switch SW1. A reset pin RST of the micro controller U is grounded through the resistor R1, and electrically coupled to the power supply 5V_USB through the capacitor C1. The switch SW1 is electrically coupled to the capacitor C1 in parallel. A ground pin GND of the micro controller U is grounded. A function pin VPP of the micro controller U is electrically coupled to the power supply 5V_USB through a resistor R9.

In the embodiment, the oscillating circuit 100 comprises a crystal oscillator X1, a capacitor C2, and a capacitor C3. A first oscillating pin XTAL1 of the micro controller U is electrically coupled to a first terminal of the crystal oscillator X1, and a second oscillating pin XTAL2 of the micro controller U is electrically coupled to a second terminal of the crystal oscillator X1. The first oscillating pin XTAL1 of the micro controller U is grounded through the capacitor C2. The second oscillating pin XTAL2 of the micro controller U is grounded through the capacitor C3.

In the embodiment, the warning circuit 50 comprises light-emitting diodes (LEDs) D1-D3, resistors R4-R6. An anode of the LED D1 is electrically coupled to the power supply 5V_USB through the resistor R4, and a cathode of the LED D1 is electrically coupled to a first warning pin P2.0 of the micro controller U. An anode of the LED D2 is electrically coupled to the power supply 5V_USB through the resistor R5, and a cathode of the LED D2 is electrically coupled to a second warning pin P2.1 of the micro controller U. An anode of the LED D3 is electrically coupled to the power supply 5V_USB through the resistor R6, and a cathode of the LED D3 is electrically coupled to a third warning pin P2.2 of the micro controller U. The LEDs D1-D3 respectively emitting red, yellow and blue lights.

In the embodiment, the temperature detection circuit 20 comprises a thermal resistor NTC, a capacitor C4, and a resistor R2. A temperature pin P0.7 of the micro controller U is grounded through the thermal resistor NTC and the capacitor C4 is electrically coupled to the thermal resistor NTC in parallel. The temperature pin P0.7 of the micro controller U is also electrically coupled to the power supply 5V_USB through the resistor R2. The thermal resistor NTC is placed near a component with a high temperature in the computer.

The switch circuit 30 is configured to turn on and turn off the computer and can comprise a switch SW2, a capacitor C5, and a resistor R3. A switch input pin P1.0 of the micro controller U is grounded through the switch SW2, and is also electrically coupled to the power supply 5V_USB through the resistor R3. The power supply 5V_USB is grounded through the capacitor C5.

In the embodiment, the fan speed detection circuit 40 can communicate with a super input/output (SIO) interface of the circuit board 60 through a system management bus (SMBUS) interface. The SMBUS can comprise a clock signal bus S_SMBCLK, and a data signal bus S_SMBDATA. The fan speed detection circuit 40 is for detecting a speed of a fan in the computer and comprises resistors R7 and R8. A first fan pin P3.0 of the micro controller U is electrically coupled to the clock signal bus S_SMBCLK, and is also electrically coupled to the power supply 5V_USB through the resistor R7. A second fan pin P3.1 of the micro controller U is electrically coupled to the data signal bus S_SMBDATA, and is also electrically coupled to the power supply 5V_USB through the resistor R8.

In the embodiment, when the switch SW2 is turned on, the switch circuit 30 outputs a switch signal to the switch input pin P1.0 of the micro controller U, and the micro controller U outputs a boot control signal to a boot pin MB_PWS of circuit board 60. When the boot control signal is at a low level, the computer is turned on. When the boot control signal is at a high level, the computer is turned off.

In the embodiment, the temperature detection circuit 20 can detect a temperature of the component and transmit a temperature signal to the temperature pin P0.7 of the micro controller U.

When the detected temperature is less than the minimum of a preset temperature range, the micro controller U controls the LED D1 to turn on. When the detected temperature is within the preset temperature range, the micro controller U controls the LED D2 to turn on. When detected temperature is greater than the maximum of the preset temperature range, the micro controller U controls the LED D3 to turn on.

When the detected speed of the fan is less than the minimum of a preset speed range, the micro controller U controls the LEDs D1-D3 to flash at a first frequency. When the detected speed of the fan is within the preset speed range, the micro controller U controls the LEDs D1-D3 to flash at a second frequency. When the detected speed is greater than the maximum of the preset speed range, the micro controller U controls the LEDs D1-D3 to flash at a third frequency.

In the embodiment, a CPU reset terminal of the circuit board 60 is electrically coupled to the detect pin P0.0 of the micro controller U to detect a CPU reset signal of the circuit board 60, and to detect a working status of hardware on the circuit board 60. When the hardware works normally, the detected reset signal is at a low level and the micro controller U controls the LEDs D1-D3 to turn off. When the hardware works abnormally, the detected reset signal is at a high level and, the micro controller U controls the LEDs D1-D3 to maintain the existing or original state.

The embodiments shown and described above are only examples. Many details are often found in the art such as the other features of the protection device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A protection device comprising:
   a switch circuit;
   a temperature detection circuit configured for detecting a temperature of a component of an electronic device;
   a control circuit obtaining a temperature signal from the temperature detection circuit, and comparing the detected temperature with a preset temperature range and outputting a first control signal;
   a warning circuit warnings based on the first control signal; and
   a fan speed detection circuit detecting a speed of a fan of the electronic device and transmitting a speed signal to the control circuit;
   wherein the control circuit compares the detected speed with a preset speed range and outputs a second control signal to the warning circuit; and
   wherein the control circuit further comprises a micro controller, a power supply pin of the micro controller is electrically coupled to a power supply, a ground pin of the micro controller is grounded, a temperature pin of the micro controller is electrically coupled to the temperature detection circuit, first to third warning pins of the micro controller are electrically coupled to the warning circuit, an input pin of the micro controller is electrically coupled to the switch circuit, an output pin and a detect pin of the micro controller are electrically coupled to a circuit board of the electronic device, a first fan pin and a second fan pin of the micro controller are electrically coupled to the fan speed detection circuit, a function pin of the micro controller is electrically coupled to the power supply through a first resistor.

2. The protection device of claim 1, wherein the temperature protection circuit further comprises a thermal resistor, a first capacitor, and a second resistor, a temperature pin of the micro controller is grounded the thermal resistor, and is electrically coupled to the power supply through the second resistor, the first capacitor is electrically coupled to the thermal resistor in parallel.

3. The protection device of claim 1, wherein the warning circuit comprises three light-emitting diodes (LEDs) are respectively coupled between the first to third warning pins of the micro controller and the power supply.

4. The protection device of claim 3, wherein the warning circuit further comprises third to fifth resistor, an anode of the first LED is electrically coupled to the power supply through the third resistor, a cathode of the first LED is electrically coupled to the first warning pin of the micro controller, an anode of the second LED is electrically coupled to the power supply through the fourth resistor, a cathode of the second LED is electrically coupled to the second warning pin of the micro controller, an anode of the third LED is electrically coupled to the power supply through the fifth resistor, a cathode of the third LED is electrically coupled to the third warning pin of the micro controller.

5. The protection device of claim 4, wherein the first to third LEDS are controlled to respectively emit different color lights to indicate status of the detected temperature, the first to third LEDS are controlled to flash at different frequency to indicate status of the detected speed.

6. The protection device of claim 2, wherein the switch circuit comprises a switch, a second capacitor, and a sixth resistor, a switch input pin of the micro controller is grounded through the switch and is electrically coupled to the power supply through the sixth resistor, the power supply is grounded through the second capacitor.

* * * * *